(12) United States Patent
Nemirovsky

(10) Patent No.: US 11,480,441 B2
(45) Date of Patent: Oct. 25, 2022

(54) SYSTEMS AND METHODS FOR TRAIL VISUALIZATION USING AUGMENTED REALITY

(71) Applicant: Arthur Nemirovsky, Eastvale, CA (US)

(72) Inventor: Arthur Nemirovsky, Eastvale, CA (US)

(*) Notice: Subject to any disclaimer, the term of this patent is extended or adjusted under 35 U.S.C. 154(b) by 216 days.

(21) Appl. No.: 16/998,934

(22) Filed: Aug. 20, 2020

(65) Prior Publication Data
US 2022/0057224 A1 Feb. 24, 2022

(51) Int. Cl.
*G01C 21/36* (2006.01)
*G01C 21/34* (2006.01)
*H04W 4/024* (2018.01)
*G06V 20/20* (2022.01)
*G06V 20/64* (2022.01)
*H04W 88/02* (2009.01)

(52) U.S. Cl.
CPC ..... *G01C 21/3638* (2013.01); *G01C 21/3407* (2013.01); *G01C 21/3647* (2013.01); *G06V 20/20* (2022.01); *G06V 20/64* (2022.01); *H04W 4/024* (2018.02); *H04W 88/02* (2013.01)

(58) Field of Classification Search
CPC .... G08G 1/0145; G08G 1/0133; G08G 1/015; G08G 1/095; B60W 60/0053; B60W 40/04
See application file for complete search history.

(56) References Cited

U.S. PATENT DOCUMENTS

| | | | |
|---|---|---|---|
| 10,994,866 B1* | 5/2021 | He | G01M 9/062 |
| 2004/0218910 A1* | 11/2004 | Chang | G01C 21/3647 386/328 |
| 2013/0241920 A1* | 9/2013 | Yang | A63F 13/52 345/419 |
| 2015/0011362 A1* | 1/2015 | Oh | A63B 22/0605 482/9 |
| 2018/0039325 A1* | 2/2018 | Delaney | G02B 27/017 |
| 2018/0058858 A1* | 3/2018 | Bitan | G01V 99/005 |
| 2019/0151757 A1* | 5/2019 | Kozloski | A63F 13/216 |
| 2020/0302510 A1* | 9/2020 | Chachek | H04W 4/021 |
| 2021/0148708 A1* | 5/2021 | Bitan | G01C 21/387 |
| 2022/0057224 A1* | 2/2022 | Nemirovsky | G01C 21/3647 |

* cited by examiner

*Primary Examiner* — Hussein Elchanti
(74) *Attorney, Agent, or Firm* — Kevin Schraven; Anooj Patel; Hankin Patent Law, APC

(57) ABSTRACT

Systems and methods for providing an augmented reality display of a virtual trail overlay that is aligned with a real world scene on a camera scene display of a mobile device, the mobile device being in networked communication via a network with a server and a trail database, the method comprising: generating three-dimensional map data to be displayed as a virtual trail overlay on a camera display of the mobile device, processing by a visualization application on the mobile device, such that an augmented reality virtual trail overlay is displayed on the camera display of the mobile device. Refreshing the virtual trail whenever the mobile device is moved.

19 Claims, 11 Drawing Sheets

SYSTEMS AND METHODS FOR TRAIL VISUALIZATION USING AUGMENTED REALITY

FIELD

The present disclosure relates generally to augmented reality. More particularly, the disclosure relates to a geospatial data visualization system.

BACKGROUND

The disclosed technology generally relates to generally to the field of navigation systems, and more particularly to displaying virtual trail or pathway information using augmented reality in connection with a personal electronic device.

When hiking and biking there are many possible terrains and conditions that can make visually identifying the precise location of a trail or desired path very challenging. In some cases, the ambiguity of trail locations may create significant risk or be life threatening. For example, hikes or bike rides in wooded areas with leaf-covered paths may greatly increase deviating from intended paths and getting lost. Use of hiking or biking trails at night, snow covered trails, and adverse weather may also increase the risk of injury or disorientation.

Use of global positioning systems (GPS) to determine current location and directions may lack short distance details of trails. GPS devices operate based on a satellite navigation system that provides location and time information anywhere there is unobstructed line of sight access to four or more GPS satellites, is maintained by the United States government, and is accessible to anyone with a GPS receiver. Short distance details of trails may indicate easier or more difficult sections of a trail or indicate the most commonly traveled trail. Devices that present map or satellite image information may lack or complicate determination of proper direction orientation from the user's perspective. Some navigation devices, such as GPS display devices, may be difficult to interpret and the user may need to determine how to hold and orient the device in a precise direction so that the display aligns with an intended travel route.

Accordingly, there has been a long-felt need for systems and methods for displaying virtual trail or pathway information on personal electronic devices.

SUMMARY

The following presents a simplified overview of the example embodiments in order to provide a basic understanding of some embodiments of the example embodiments. This overview is not an extensive overview of the example embodiments. It is intended to neither identify key or critical elements of the example embodiments nor delineate the scope of the appended claims. Its sole purpose is to present some concepts of the example embodiments in a simplified form as a prelude to the more detailed description that is presented hereinbelow. It is to be understood that both the following general description and the following detailed description are exemplary and explanatory only and are not restrictive.

In accordance with the embodiments disclosed herein, the present disclosure is directed to displaying virtual trail or pathway information using augmented reality in connection with a personal electronic device. This is a significant improvement over the current methods and systems, which overlay a line on a map to show the path that needs to be followed.

One embodiment may be a method of providing to a mobile device an augmented reality display of a virtual trail overlay that is aligned with a real world scene on a camera scene display, the mobile device comprising a camera, a display, at least one processor, a visualization application, and one or more sensors, the mobile device being in networked communication via a network with a server and a trail database, the method comprising the steps of: generating a plurality of three-dimensional map data to be displayed as a virtual trail overlay for a plurality of trails, comprising the steps of: receiving by the server via the network a plurality of map data associated with one or more selected trails; analyzing by the server the received map data associated with the one or more selected trails to obtain a plurality of latitude and longitude coordinates for a plurality of reference points along each of the one or more selected trails; adding, for each of the one or more selected trails, each of the plurality of reference points to an object array; converting the object array to a compressed polyline; wherein the compressed polyline comprises a string of latitude and longitude coordinates; sending the string of latitude and longitude coordinates to a map elevation application program interface (API) service, which provides a plurality of altitude data; determining by the server an altitude for each of the plurality of reference points by using the string of latitude and longitude coordinates and the plurality of altitude data, such that a plurality of three-dimensional map data for each of the one or more selected trails is created for use in generating the virtual trail overlay; storing the plurality of three-dimensional map data in the trail database; receiving by the visualization application a trail navigation input, which comprises a destination location and at least a starting location for a selected trail to be traversed; accessing by the visualization application the plurality of three-dimensional map data associated with the trail navigation input of the selected trail to be traversed, such that the visualization application has a selected trail portion of the plurality of three-dimensional map data; and orienting and processing by the visualization application a current location of the mobile device with the selected trail portion in order to generate the virtual trail overlay on the camera scene display of the mobile device, comprising the steps: converting by the visualization application the selected trail portion of the plurality of three-dimensional map data into a plurality of cartesian x/y/z positions relative to the current location of the mobile device; adding by the visualization application a location node at each of the plurality of cartesian x/y/z positions; and placing each of the location nodes in the camera scene display and comparing a node position of each of the location nodes to a given location position of one or more surrounding location nodes in order to determine a translation angle, such that the virtual trail overlay is visible on the camera scene display of the mobile device; and displaying the virtual trail overlay on the camera scene display of the mobile device, such that a user may follow an actual trail corresponding to the virtual trail overlay. In some cases, the plurality of map data may be provided by a third-party provider. The method may also comprise receiving by the server via the network one or more images associated with the one or more selected trails, which may be provided by a third-party provider. The method may also comprise receiving by the server via the network a plurality of point of interest data associated with the one or more selected trails, which may be provided by a third-party provider. The method may further comprise generating by the server a plurality of elevation data for each of the one or more selected trails and displaying to the user a plurality of elevation changes along each of the one or more selected trails. If the map elevation API service does not have precise elevation data for each point in the plurality of elevation data, the elevation data may be generated as interpolated data. The method may further comprise caching the plurality of three-dimensional map data for a selected trail to the mobile device and recalculating and redrawing the virtual trail overlay on the camera scene display of the mobile device after movement is detected by the one or more sensors of the mobile device, such that the virtual trail overlay on the camera scene display of the mobile device is constantly being updated as the mobile device is moved, repositioned, or reoriented.

Another embodiment may be a method of providing an augmented reality display of a virtual trail overlay that is aligned with a real world scene on a camera scene display of a mobile device, the mobile device comprising a camera, a display, at least one processor, a visualization application, and one or more sensors, the mobile device being in networked communication via a network with a server and a trail database, the method comprising: generating a plurality of three-dimensional map data to be displayed as a virtual trail overlay for a plurality of trails, comprising the steps of: receiving by the server via the network a plurality of map data associated with one or more selected trails; receiving by the server via the network a plurality of altitude data related to the plurality of map data associated with one or more selected trails; combining by the server the plurality of map data associated with one or more selected trails and the plurality of altitude data, such that the plurality of three-dimensional map data for each of the one or more selected trails is created for use in generating the virtual trail overlay. The method may further comprise: storing the plurality of three-dimensional map data in the trail database; receiving by the visualization application a trail navigation input, which comprises a destination location and at least a starting location for a selected trail to be traversed; accessing by the visualization application the plurality of three-dimensional map data associated with the trail navigation input of the selected trail to be traversed, such that the visualization application has a selected trail portion of the plurality of three-dimensional map data; and orienting and processing by the visualization application a current location of the mobile device with the selected trail portion in order to generate the virtual trail overlay on the camera scene display of the mobile device, comprising the steps: converting by the visualization application the selected trail portion of the plurality of three-dimensional map data into a plurality of cartesian x/y/z positions relative to the current location of the mobile device; adding by the visualization application a location node at each of the plurality of cartesian x/y/z positions; and placing each of the location nodes in the camera scene display and comparing a node position of each of the location nodes to a given location position of one or more surrounding location nodes in order to determine a translation angle, such that the virtual trail overlay is visible on the camera scene display of the mobile device. The method may further comprise recalculating and redrawing the virtual trail overlay on the camera scene display of the mobile device after movement is detected by the one or more sensors of the mobile device, such that the virtual trail overlay on the camera scene display of the mobile device is constantly being updated as the mobile device is moved, repositioned, or reoriented. The plurality of altitude data may be received from a map elevation application program interface (API) service. The method may further comprise: generating by the server a plurality of elevation data for each of the one or more selected trails; and displaying to the user a plurality of elevation changes along each of the one or more selected trails. If the map elevation API service does not have precise elevation data for each point in the plurality of elevation data, the elevation data may be generated as interpolated data. The method may further comprise caching the plurality of three-dimensional map data for a selected trail to the mobile device.

Another embodiment may be a method of providing to a mobile device an augmented reality display of a virtual trail overlay that is aligned with a real world scene on a camera scene display, the mobile device comprising a camera, a display, at least one processor, a visualization application, and one or more sensors, the mobile device being in networked communication via a network with a server and a trail database, the method comprising the steps of: generating a plurality of three-dimensional map data to be displayed as a virtual trail overlay for a plurality of trails, comprising the steps of: receiving by the server via the network a plurality of map data associated with one or more selected trails; analyzing by the server the received map data associated with the one or more selected trails to obtain a plurality of latitude and longitude coordinates for a plurality of reference points along each of the one or more selected trails; adding, for each of the one or more selected trails, each of the plurality of reference points to an object array; converting the object array to a compressed polyline; wherein the compressed polyline comprises a string of latitude and longitude coordinates; sending the string of latitude and longitude coordinates to a map elevation application program interface (API) service, which provides a plurality of altitude data; determining by the server an altitude for each of the plurality of reference points by using the string of latitude and longitude coordinates and the plurality of altitude data, such that a plurality of three-dimensional map data for each of the one or more selected trails is created for use in generating the virtual trail overlay; storing the plurality of three-dimensional map data in the trail database; caching the plurality of three-dimensional map data for a selected trail to a the mobile device; receiving by the visualization application a trail navigation input, which comprises a destination location and at least a starting location for a selected trail to be traversed; accessing by the visualization application the plurality of three-dimensional map data associated with the trail navigation input of the selected trail to be traversed, such that the visualization application has a selected trail portion of the plurality of three-dimensional map data; and orienting and processing by the visualization application a current location of the mobile device with the selected trail portion in order to generate the virtual trail overlay on the camera scene display of the mobile device, comprising the steps: converting by the visualization application the selected trail portion of the plurality of three-dimensional map data into a plurality of cartesian x/y/z positions relative to the current location of the mobile device; adding by the visualization application a location node at each of the plurality of cartesian x/y/z positions; and placing each of the location nodes in the camera scene display and comparing a node position of each of the location nodes to a given location position of one or more surrounding location nodes in order to determine a translation angle, such that the virtual trail overlay is visible on the camera scene display of the mobile device; recalculating and redrawing the virtual trail overlay on the camera scene display of the mobile device after movement is detected by the one or more sensors of the mobile device, such that the virtual trail overlay on the camera scene display of the mobile device is constantly being updated as the mobile device is moved, repositioned, or reoriented. The method may further comprise generating by the server a plurality of elevation data for each of the one or more selected trails and displaying to the user a plurality of elevation changes along each of the one or more selected trails. If the map elevation API service does not have precise elevation data for each point in the plurality of elevation data, the elevation data may be generated as interpolated data.

Still other advantages, embodiments, and features of the subject disclosure will become readily apparent to those of ordinary skill in the art from the following description wherein there is shown and described a preferred embodiment of the present disclosure, simply by way of illustration of one of the best modes best suited to carry out the subject disclosure As it will be realized, the present disclosure is capable of other different embodiments and its several details are capable of modifications in various obvious embodiments all without departing from, or limiting, the scope herein. Accordingly, the drawings and descriptions will be regarded as illustrative in nature and not as restrictive.

BRIEF DESCRIPTION OF THE DRAWINGS

The drawings are of illustrative embodiments. They do not illustrate all embodiments. Other embodiments may be used in addition or instead. Details which may be apparent or unnecessary may be omitted to save space or for more effective illustration. Some embodiments may be practiced with additional components or steps and/or without all of the components or steps which are illustrated. When the same numeral appears in different drawings, it refers to the same or like components or steps.

DETAILED DESCRIPTION OF THE ILLUSTRATIVE EMBODIMENTS

Figure 1A:
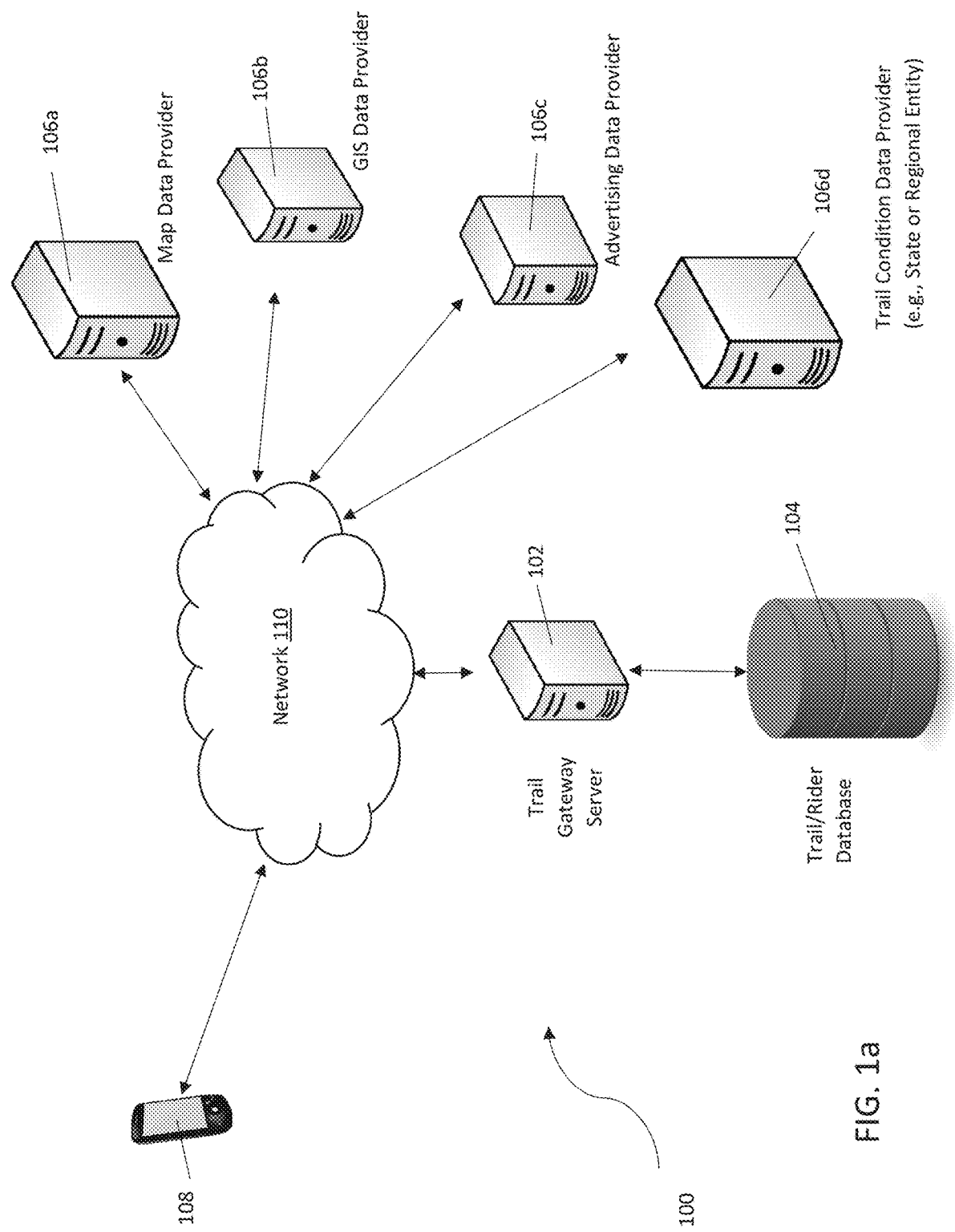
FIG. 1a is a functional block diagram illustrating an interactive system for generating virtual overlay images of trails in accordance with the systems and methods of the present disclosure.

Before the present methods and systems are disclosed and described, it is to be understood that the methods and systems are not limited to specific methods, specific components, or to particular implementations. It is also to be understood that the terminology used herein is for the purpose of describing particular embodiments only and is not intended to be limiting.

As used in the specification and the appended claims, the singular forms "a," "an," and "the" include plural referents unless the context clearly dictates otherwise. Ranges may be expressed herein as from "about" one particular value, and/or to "about" another particular value. When such a range is expressed, another embodiment includes from the one particular value and/or to the other particular value. Similarly, when values are expressed as approximations, by use of the antecedent "about," it will be understood that the particular value forms another embodiment. It will be further understood that the endpoints of each of the ranges are signify both in relation to the other endpoint, and independently of the other endpoint.

"Optional" or "optionally" means that the subsequently described event or circumstance may or may not occur, and that the description includes instances where the event or circumstance occurs and instances where it does not.

Throughout the description and claims of this specification, the word "comprise" and variations of the word, such as "comprising" and "comprises," means "including but not limited to," and is not intended to exclude, for example, other components, integers or steps. "Exemplary" means "an example of" and is not intended to convey an indication of a preferred or ideal embodiment. "Such as" is not used in a restrictive sense, but for explanatory purposes.

Disclosed are components that may be used to perform the disclosed methods and systems. These and other components are disclosed herein, and it is understood that when combinations, subsets, interactions, groups, etc. of these components are disclosed that while specific reference of each various individual and collective combinations and permutation of these may not be explicitly disclosed, each is specifically contemplated and described herein, for all methods and systems. This applies to all embodiments of this application including, but not limited to, steps in disclosed methods. Thus, if there are a variety of additional steps that may be performed it is understood that each of these additional steps may be performed with any specific embodiment or combination of embodiments of the disclosed methods.

The present methods and systems may be understood more readily by reference to the following detailed description of preferred embodiments and the examples included therein and to the Figures and their previous and following description.

As will be appreciated by one skilled in the art, the methods and systems may take the form of an entirely hardware embodiment, an entirely software embodiment, or an embodiment combining software and hardware embodiments. Furthermore, the methods and systems may take the form of a computer program product on a computer-readable storage medium having computer-readable program instructions (e.g., computer software) embodied in the storage medium. More particularly, the present methods and systems may take the form of web-implemented computer software. Any suitable computer-readable storage medium may be utilized including hard disks, CD-ROMs, optical storage devices, or magnetic storage devices.

Embodiments of the methods and systems are described below with reference to block diagrams and flowchart illustrations of methods, systems, apparatuses and computer program products. It will be understood that each block of the block diagrams and flowchart illustrations, and combinations of blocks in the block diagrams and flowchart illustrations, respectively, may be implemented by computer program instructions. These computer program instructions may be loaded onto a general-purpose computer, special purpose computer, or other programmable data processing apparatus to produce a machine, such that the instructions which execute on the computer or other programmable data processing apparatus create a means for implementing the functions specified in the flowchart block or blocks.

These computer program instructions may also be stored in a computer-readable memory that may direct a computer or other programmable data processing apparatus to function in a particular manner, such that the instructions stored in the computer-readable memory produce an article of manufacture including computer-readable instructions for implementing the function specified in the flowchart block or blocks. The computer program instructions may also be loaded onto a computer or other programmable data processing apparatus to cause a series of operational steps to be performed on the computer or other programmable apparatus to produce a computer-implemented process such that the instructions that execute on the computer or other programmable apparatus provide steps for implementing the functions specified in the flowchart block or blocks.

Accordingly, blocks of the block diagrams and flowchart illustrations support combinations of means for performing the specified functions, combinations of steps for performing the specified functions and program instruction means for performing the specified functions. It will also be understood that each block of the block diagrams and flowchart illustrations, and combinations of blocks in the block diagrams and flowchart illustrations, may be implemented by special purpose hardware-based computer systems that perform the specified functions or steps, or combinations of special purpose hardware and computer instructions.

In the following description, certain terminology is used to describe certain features of one or more embodiments. For purposes of the specification, unless otherwise specified, the term "substantially" refers to the complete or nearly complete extent or degree of an action, characteristic, property, state, structure, item, or result. For example, in one embodiment, an object that is "substantially" located within a housing would mean that the object is either completely within a housing or nearly completely within a housing. The exact allowable degree of deviation from absolute completeness may in some cases depend on the specific context. However, generally speaking, the nearness of completion will be so as to have the same overall result as if absolute and total completion were obtained. The use of "substantially" is also equally applicable when used in a negative connotation to refer to the complete or near complete lack of an action, characteristic, property, state, structure, item, or result.

As used herein, the terms "approximately" and "about" generally refer to a deviance of within 5% of the indicated number or range of numbers. In one embodiment, the term "approximately" and "about", may refer to a deviance of between 0.001-10% from the indicated number or range of numbers.

Various embodiments are now described with reference to the drawings. In the following description, for purposes of explanation, numerous specific details are set forth in order to provide a thorough understanding of one or more embodiments. It may be evident, however, that the various embodiments may be practiced without these specific details. In other instances, well-known structures and devices are shown in block diagram form to facilitate describing these embodiments.

Embodiments of the systems and methods of the present disclosure overlay a designated or selected navigation route, also referred to as a path or a trail, on the display of a mobile device, providing navigation information to the user of the mobile device. Some embodiments include displaying an overview of an entire length of the path to be traversed as an overlay on the display of the mobile device, whereas, in other embodiments, a near-distance overlay of a portion of the path and direction to traverse is displayed on the mobile device.

Some embodiments may include receiving data from sensors and devices, which determines the location and orientation of the view displayed on the mobile device, enabling an accurate overlay of a virtual path on the real-world environment as viewed via the mobile device. Some embodiments provide navigational information and may illuminate or virtually display a path or trail on the display of all the possible paths from the viewer's visual perspective based on GPS coordinates, angle of the user's vision, and imported maps.

FIG. 1a is a functional block diagram illustrating an interactive system for generating virtual overlay images of trails in accordance with the systems and methods of the present disclosure. FIG. 1a is a functional block diagram illustrating an interactive system for generating virtual overlay images of trails in accordance with the present disclosure. FIG. 1a provides only an illustration of one implementation and does not imply any limitations with regard to the environments in which different embodiments may be implemented. Many modifications to the depicted system may be made by those skilled in the art without departing from the scope of the disclosure as recited by the claims.

The interactive system 100 may include a server system, shown as trail gateway server 102, hosting a trail and user database 104. The trail gateway server 102, referred to herein as server 102, generally corresponds to one or more computing systems configured to store and process data associated with one or more users, as well as data associated with trails of interest to those users. Such data may be located in the trail database 104 or may be received from any of a plurality of data providers, such as data providers 106a-d, discussed below. The server 102 is accessible via a mobile device 108. The mobile device 108 may be a mobile computing device, such as a mobile phone, a smartphone, a portable media player, a tablet computing device, a laptop computing device, a smart watch, a smart glass, or any other mobile computing device. The mobile device 108 suitably includes a display or screen 109 for displaying data thereon, such as navigation interfaces in accordance with the present disclosure. The server 102, trail database 104, data providers 106a-d, and mobile device 108 are interconnected via network 110. The network 110 may be, for example, a local area network (LAN), a telecommunication network, a wide area network (WAN), such as the Internet, a virtual local area network (VLAN), a cable broadcasting delivery network, a satellite broadcasting delivery network, or any combination that may include wired, wireless, or optical connections.

In the embodiment shown, a plurality of third-party data services is integrated with the information delivered to the users of mobile device 108. The data services, provided by data providers 106a-d, allow for integration of a variety of types of data in a user interface coordinated by server 102. In the embodiment shown, the data providers 106a-d include a map data provider 106a, a Geographic Information Systems (GIS) data provider 106b, an advertising data provider 106c, and a trail condition data provider 106d.

The map data provider 106a delivers map services to the server 102, with which various data overlay services can be provided including trail or route data, trail or route plans, GIS data, or other types of information as discussed herein. The GIS data provider 106b similarly provides overlay information allowing for definition of topography, locations of properties, locations of cities/towns, trails, roads, and other information. In some embodiments, the advertising data provider 106c delivers advertisements to users and the advertising systems of the present disclosure may take many forms. In some cases, when a particular route is being displayed, advertising proximate to the location may be displayed to the user. In such cases, the advertising may be managed by the server 102, or specific advertising businesses may be selected. In one embodiment, the trail condition data provider 106d provides to the server 102 trail condition data. This trail condition data may include third party trail condition data, such as may be monitored by a governmental organization (e.g., the department of natural resources for the state in which the trail is located), regional groups, or social media content. Trail condition data may include recent changes to terrain or features that are not indicated in map data, such as landslides, washed out bridges, or extremely low water levels of rivers or creeks that allow easy crossing.

In some embodiments, the mobile device 108 receives virtual images from server 102 and/or trail database 104, which overlay the viewable surrounding landscape of the location environment, indicating a path and direction associated with the navigation to a chosen or input destination. In some embodiments of the methods and systems of the present disclosure, the mobile device 108 displays virtual lines, arrows, shapes, or other virtual objects on the display thereof, effectively overlaying the camera viewable surrounding landscape and super imposing path or trail direction on the camera viewable landscape. The presentation and orientation of the virtual display of a path or trail is dependent on the orientation and incline of the line-of-sight of mobile device 108. If the mobile device is facing in the direction of the path to be traversed, the virtual overlay of a path, for example, lines or arrows overlaying the path and indicating the direction to follow, is displayed on the camera display thereof. If the mobile device 108 is facing in a direction away from the direction of the path to be traversed toward a destination, the virtual overlay will not appear, but arrows may be displayed indicating the direction the user needs to turn to view the trail selected on the camera display.

Figure 1B:
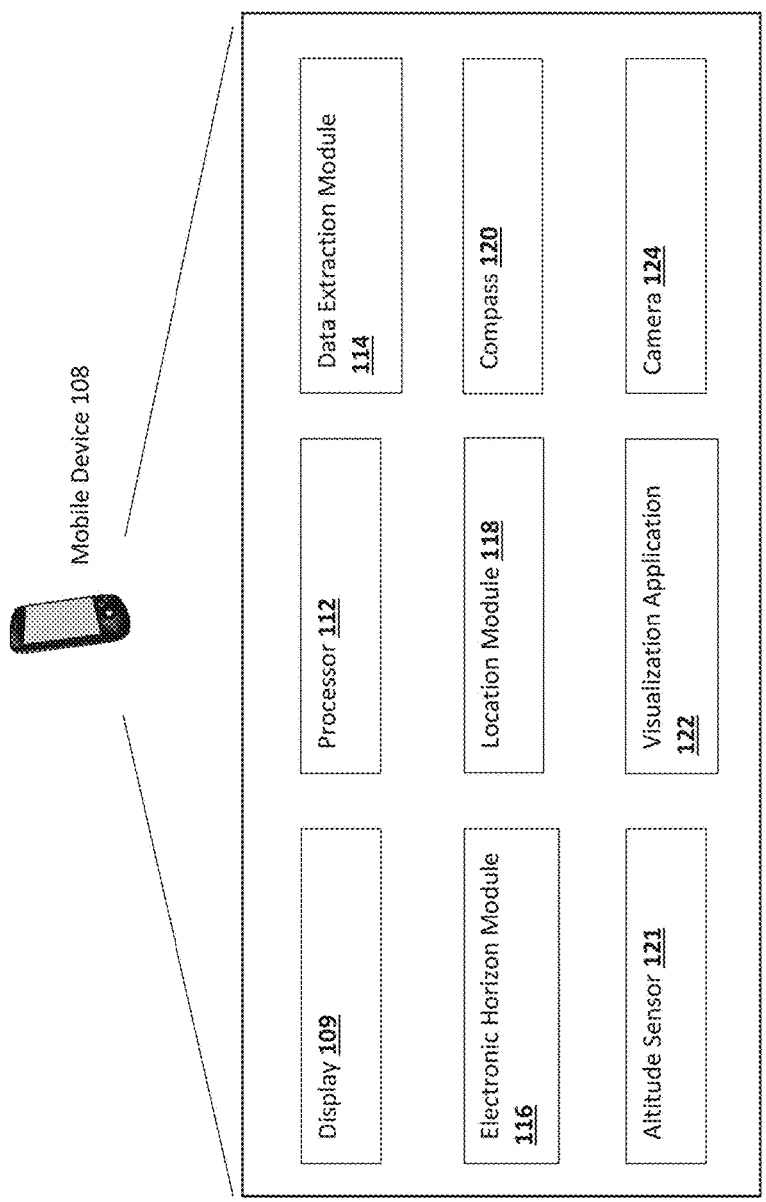
FIG. 1b illustrates one embodiment of a personal electronic device that displays the systems and methods of the present disclosure.

FIG. 1b illustrates one embodiment of a personal electronic device that displays the systems and methods of the present disclosure. In one embodiment, the mobile device 108 may include components that assist in the generation of the virtual display as shown in FIG. 1b. In some embodiments, the mobile device 108 may include a data extraction module 114 that retrieves path data from a remote location. A module such as data extraction module 114, electronic horizon module 116, and location module 118 may be a combination of program instructions configuring processor 112 and hardware elements. For example, data extraction module 114 may include I/O circuitry that communicates with network 110, as well as program instructions that communicate instructions between processor 112 and the I/O circuitry. The data extraction module 114 may extract path data from the trail database 104 or other sources, such as satellite data, traffic maps, real estate maps, national geologic map database, user reported map data, terrain maps etc. For ease of illustration, such map data is shown as being retrieved from trail database 104 over network 110 by the data extraction module 114 in FIG. 1b. For example, the path data may be retrieved from a remote server that compiles path data from different sources and formats the path data to identify intersections, the names of the paths, and different nodes along the various paths. The path data may also specify the geometric arrangement according to which different paths are connected and/or are arranged with respect to one another. The mobile device also preferably has memory that is capable of caching trail and other data locally to allow seamless presentation of the augmented reality trail line.

The mobile device 108 may also be able to determine its current location and bearing. For example, the mobile device 108 may include a location module 118 that is able to identify the current location of the mobile device 108. For example, location module 118 may include GPS communication circuit(s) that communicate(s) with satellites directly or indirectly through other computing devices over network 110 to obtain the position of the mobile device 108, and program instructions that communicate instructions between processor 112 and the GPS communication circuit(s). The location module may also include additional hardware such as an accelerometer to detect the speed of the user's movement and program instructions that communicate instructions between processor 112 and such additional hardware. Information detected by the accelerometer may be used by the processor 112 to update the navigation interfaces in an accurate and timely manner. Additionally, or alternatively, the mobile device 108 may obtain its location by connecting over a wireless network such as network 110. The mobile device 108 may detect signals from nearby wireless access points and may determine signal strength from such access points. The mobile device 108 may refer to a database of wireless networks, which may indicate where each uniquely identified access point is located. By using the determined signal strength of each wireless access point, the mobile device 108 may be able to determine distance from each wireless access point to pinpoint the location of the mobile device. Other methods may be used to identify the location of the mobile device 108 such as communicating with wireless beacons, inertial sensors located on the mobile device 108, etc., in addition or as alternatives to the methods described above. The mobile device 108 may also be able to identify its own bearing using an on-board compass 120 and altitude sensor 121. For example, the compass 120 on mobile device 108 may be a magnetometer that is able to determine the bearing in which the mobile device 108 is moving. The processor 112 of the mobile device 108 may use such location and bearing information along with the path data and the POI data to generate navigation user interfaces described herein.

In some embodiments, the mobile device 108 may use the path data and POI data retrieved by the data extraction module 114 to generate an electronic horizon. An electronic horizon may be a model that provides information on paths and POIs near the current location of the mobile device 108. The electronic horizon module 116 may generate a representation of paths near the current location of the mobile device 108. The electronic horizon module 116 may include hardware that communicates with data extraction module 114 and processor 110. The electronic horizon module may include program instructions that facilitate communication between processor 112, data extraction module 114, and the hardware components of electronic horizon module 116. The program instructions of electronic horizon module 116 may specify how an electronic horizon may be generated and how the processor should interpret the electronic horizon to generate different navigation interfaces.

In some embodiments, electronic horizon information may be used by the processor 112 to generate different navigation interfaces described herein. The processor 112 may use electronic horizon data to determine how to arrange the display of different navigational elements of the multiple navigation user interfaces described herein. In some embodiments, the mobile device 108 may generate a display of the navigation interfaces using a visualization application 122. The processor 112 may generate data required to generate a display of the navigation interfaces. Once such computation has been performed, the processor 112 may load such generated data into the visualization application 122 to generate a display of the navigation interfaces described herein.

In some embodiments, the mobile device 108 includes an electronic camera 124 capable to taking still images and continuous video. In one embodiment of the methods and systems of the present disclosure, visualization application 122 receives image and/or video input from camera 124 and by use of object recognition, may supplement downloaded map data in identifying and virtually displaying paths or trails on the display of mobile device 108.

In some embodiments, the mobile device 108 receives virtual images from server 102 and/or trail database 104, which overlay the viewable surrounding landscape of the location environment on the display 109, indicating a path and direction associated with the navigation to a chosen or input destination. In some embodiments, the mobile device 108 displays virtual lines, arrows, shapes, or other virtual objects on the display thereof, effectively overlaying the viewable surrounding landscape and super imposing path or trail direction on the viewable landscape. The presentation and orientation of the virtual display of a path or trail is dependent on the orientation and incline of the line-of-sight of camera 124 of the mobile device 108. If the camera 124 is facing in the direction of the path to be traversed, the virtual overlay of a path, for example, lines or arrows overlaying the path and indicating the direction to follow, is shown on display 109. If the camera 124 is facing in a direction away from the direction of the path to be traversed toward a destination, the virtual display overlay will not appear on the display 109, but arrows will be displayed indicating the direction the user needs to turn to view the trail selected.

In some embodiments, the display 109 displays information associated with a path or trail being traversed. For example, distances to particular points along the path towards a destination may be displayed, along with information the path or trail, such as danger warnings. In other embodiments, information associated with the average time required to reach an indicated destination from the current location, following the displayed path, is displayed on the display 109. In yet other embodiments, multiple paths may be presented to a user of the mobile device 108, offering options and indicating information associated with the path options, such as difficulty, speed of completion, and frequency of use by others. Compass 120 and altitude sensor 121 provide input to the visualization application 122 regarding the directional orientation and altitude of the camera 124.

Map data received from the trail database 104 includes detailed map information corresponding to areas that a user of the mobile device 108 may traverse. In some embodiments, map data is retrieved in response to receiving input indicating the area to be traversed. The input may be by direct input of an area name, path name, GPS coordinates of a destination, direction and distance, or may be captured by camera 124 and interpreted by visualization application 122. Map data may include topography and features of the area to be traversed which, in some embodiments, may include, trails, paths, forest areas, moving water, water crossings, tree lines, rocky areas, open fields, roads, parks, campsites, and the like.

In some embodiments the mobile device 108 may comprise a map elevation application program interface (API) service (such as Google® Maps), which may be used in conjunction with or instead of the modules discussed herein.

Figure 2:
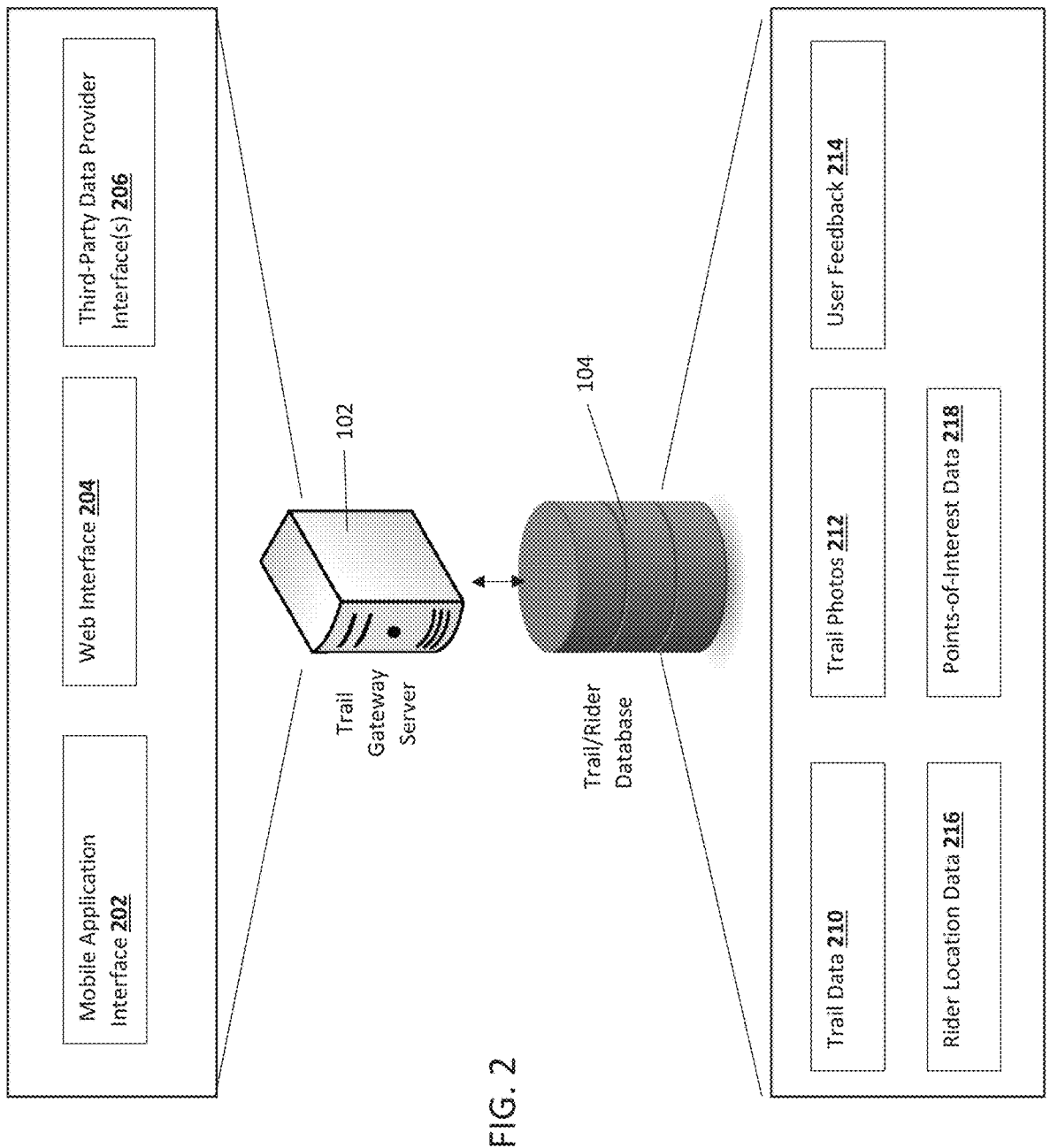
FIG. 2 illustrates one embodiment of a server and database useable with the interactive system in accordance with the systems and methods of the present disclosure.

FIG. 2 illustrates one embodiment of a server and database useable with the interactive system in accordance with the systems and methods of the present disclosure. The server 102 generally provides a plurality of interfaces and services by which data are aggregated and delivered to users of the system. In the embodiment shown, the server 102 may comprise a mobile application interface 202, and a web interface 204 that may provide users access to various mapping, planning, and on-trail data services. The web interface 202 allows a user to connect to the server 102 via the mobile device 108 and register with the server 102. The mobile application interface 202 provides analogous functionality via a downloadable application stored on the mobile device 108. In addition to the mobile application and web interfaces 202-204, in the embodiment shown the server 102 includes a plurality of data interfaces. These data interfaces can include, for example, a third-party data provider interface 206, which receives and manages data associated with data providers 106*a-d*.

The database 104 stores various types of data used by the server 102, including the various interfaces 202-206, to generate, along with data providers 106*a-d*, services to be presented to users. In the embodiment shown, the database 104 includes trail data 210 used for route planning purposes, which can include routes, property details, and trail condition data as may be received from a third-party data provider. The database 104 can also include trail photos 212, either submitted by user who have previously traveled along the trails, or from a trail photo capture system useable to generate a "fly-through" sequential photo playback that simulates traveling along the trail. The database 104 further includes user feedback 214, which can include reviews of a trail, as well as ratings of the trail (e.g., difficulty, time required to traverse, etc.) as well as notes regarding points of interest, or other features.

In one embodiment, the database 104 includes user location data 216 which can be received from a mobile device hosting a complementary application via mobile interface 202. The user location data 216 may be used to provide turn-by-turn navigation along a trail, and is also selectively published to other users, for example other users in a group of users who wish to track each other's progress along a trail.

Additionally, points-of-interest (POI) data 218 is received from users and includes specific POI along the trail.

In operation, the visualization application 122 receives information from the trail database 104, location module 118, and input from compass 120 and altitude sensor 121 and provides a virtual overlay of a path or trail to a designated destination on the display 109 of mobile device 108. In some embodiments, the visualization application 122 determines the view of the user of the mobile device 108 from the input of compass 120 and altitude sensor 121, in combination with compass 120 and altitude sensor 121. The visualization application 122 determines the position of the path or trail of interest and overlays the path on the display 109 of mobile device 108 when some or all of the path is within the real-world direction the camera 124. In addition to the altitude sensor 121, the mobile device 108 may further comprise movement sensors, such as gyroscopes and accelerometers, which may detect movement of the device 108. The compass may be a global positioning system compass.

In some embodiments, the visualization application 122 determines and provides distance and duration information based on the input from one or a combination of the location module 118, map data, and third-party providers 106a-d. The distance of an entire path or trail may be determined and displayed on the display 109 of mobile device 108, or alternatively, the path may be displayed for the next one hundred feet, as desired by the user. In some embodiments, the visualization application 122 determines and displays the distance to a next turn or decision point, or the distance to an object of interest, such as a water supply, tree line, or summit.

Figure 3:
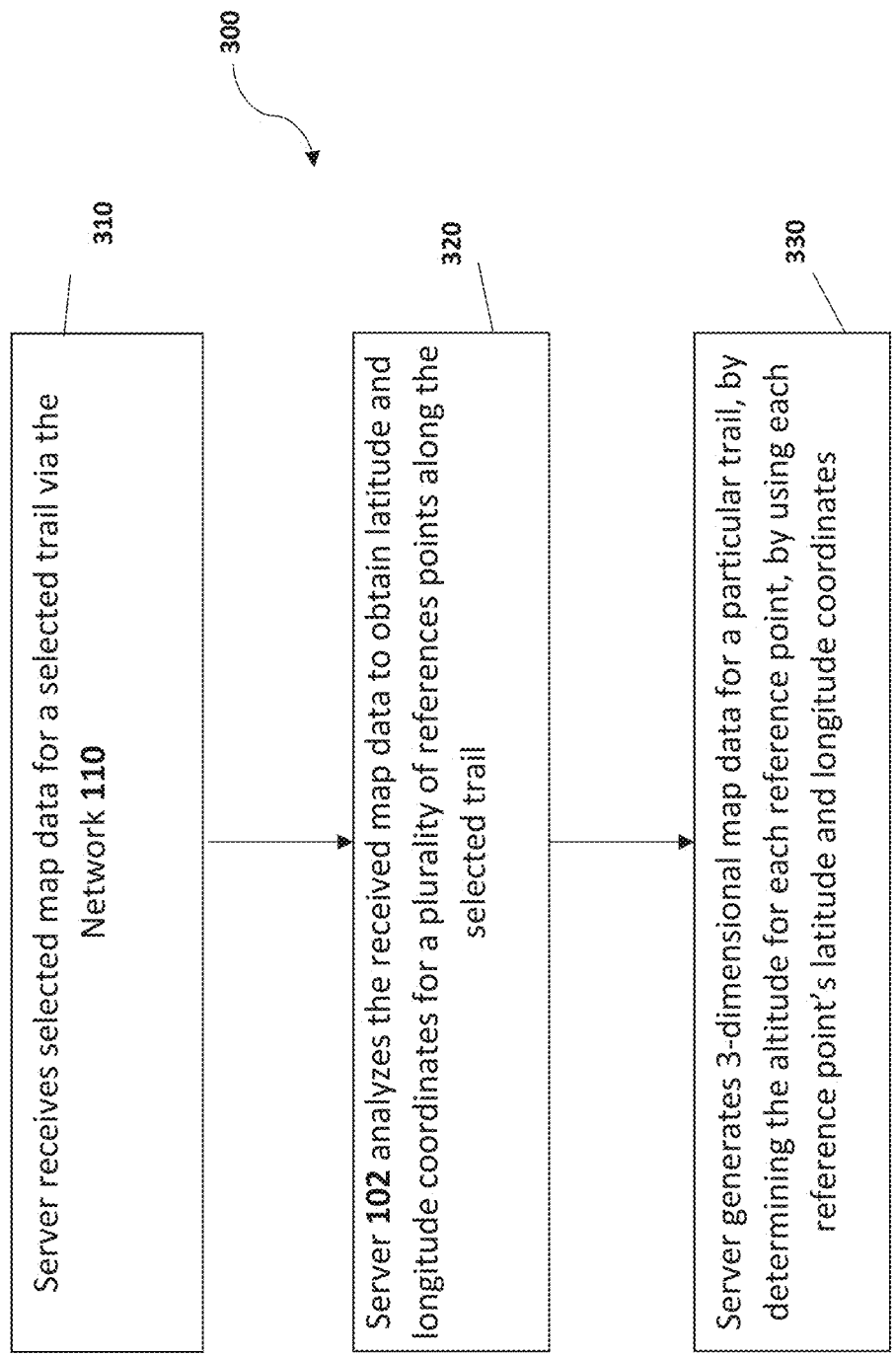
FIG. 3 illustrates one embodiment of a method for generating 3-dimensional map data for use within the interactive system in accordance with the systems and methods of the present disclosure.

FIG. 3 illustrates one embodiment of a method for generating 3-dimensional map data for use within the interactive system in accordance with the systems and methods of the present disclosure. FIG. 3 illustrates one embodiment of a method for the server 102, in conjunction with providers 106-*a-d*, which may be third-party providers, to generate 3-dimensional map data to be displayed as a virtual overlay for a plurality of trails. At 310, the server receives via network 110 selected map data for a selected trail, such as a hiking, running, and/or bicycle trail, from at least one of a map data provider 106a, GIS data provider trail map data from private companies, open data government sources, social media content, and the like. In another embodiment, the server 102 may receive image data associated with the selected trail and generate trail map data therefrom. While reference is made to a single trail for ease of understanding, it is understood that the server 102 may receive map data for a plurality of trails and that augmented trail data is generated for each of the plurality of trails.

At 320, the server 102 may analyze the received map data to obtain latitude and longitude coordinates for a plurality of reference points along the selected trail. Each point on the trail may be added to an object array and then converted to a compressed polyline. This compressed polyline string of latitude and longitude coordinates may ben be passed to a map elevation application program interface (API) service (such as Google® Maps).

At 330, using the latitude and longitude coordinates for each reference point, the server 102 may determine the altitude for each reference point to generate 3-dimensional map data for the particular trail. A separate API communication to the map elevation API may then be made and each latitude and longitude coordinate may be passed to the map elevation API. The map elevation API may preferably provide elevation data for all locations on the surface of the Earth, including depth locations in seas and oceans (which are returned as negative values). The system may also generate and provide elevation data along the paths (such as at the reference points) allowing the user to calculate and view elevation changes along the routes. In the event that the map elevation API does not have the exact elevation measurements at any precise location/reference point, the system is configured to interpolate the data and deliver to the user an average value from the nearest known locations/points (2, 3, 4, or more points, with four (4) being preferred). Preferably, elevation values and data are expressed relative to the local mean sea level (LMSL). The 3-dimensional map data is stored in the trail database 104 for use in generating a virtual overlay of the trail route. Preferably, the trail data is also locally cached to the user's device so that it is available to the device in the event that access to the network is disrupted.

Figure 4:
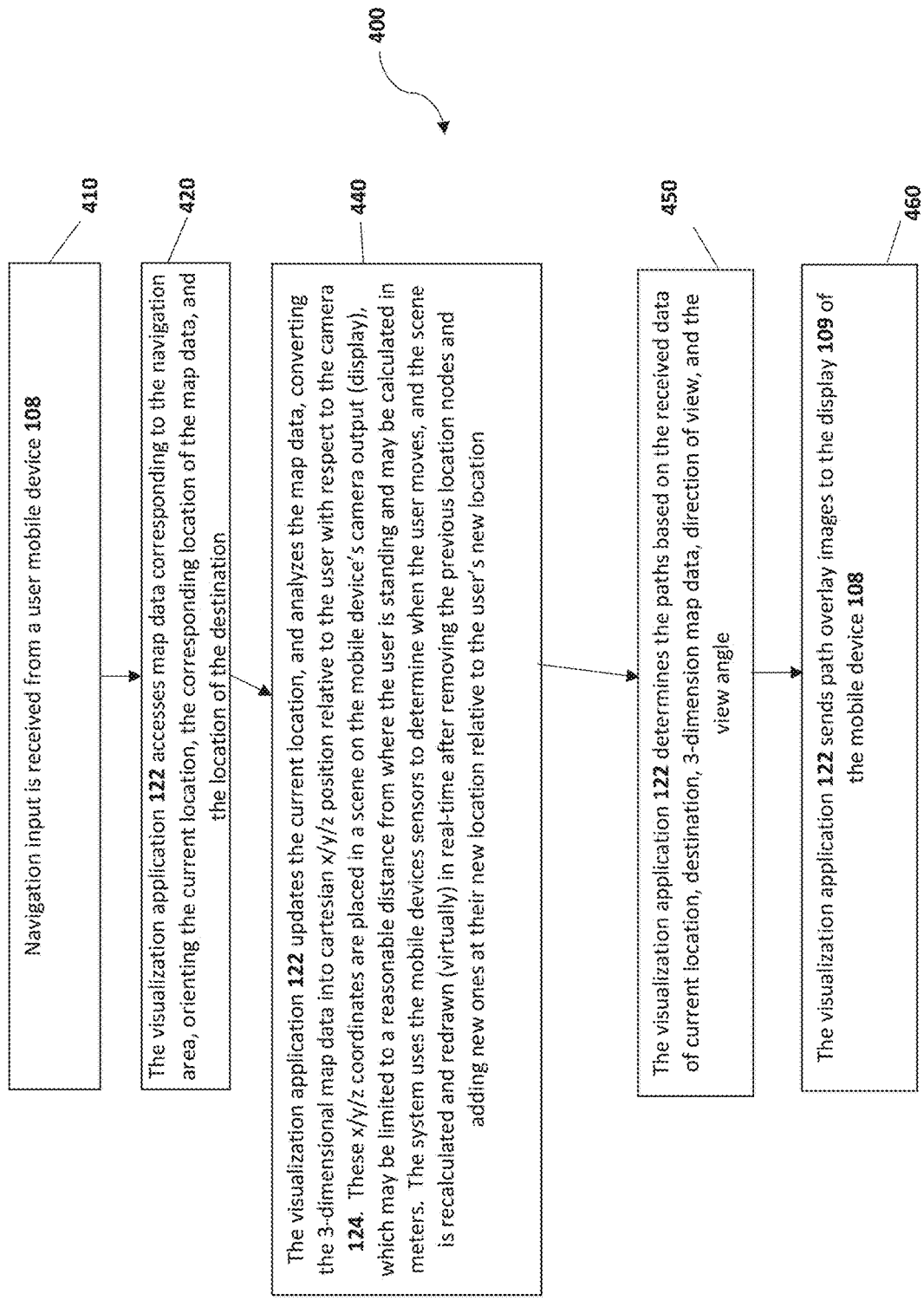
FIG. 4 illustrates one embodiment of a method for generating augmented trail data for use in navigation interfaces within the interactive system in accordance with the systems and methods of the present disclosure.

FIG. 4 illustrates one embodiment of a method for generating augmented trail data for use in navigation interfaces within the interactive system in accordance with the systems and methods of the present disclosure. FIG. 4 illustrates operational steps of the visualization application 122, providing a virtual overlay of a trail route on the display 109 of mobile device 108, in accordance with one embodiment. The visualization application 122 receives navigation input, including destination and starting location as shown at 410. Navigation input may be received from a user of mobile device 108 which, in some embodiments, includes information regarding a destination point, and an initial starting point. In other embodiments, the starting point may be determined by input from location module 118, and destination input may include receiving GPS coordinates of the destination point. In other embodiments, the route to be navigated may be identified by entry of a name or other identifying attribute that may be included in map data received from map data, for example.

The visualization application 122 may access map data corresponding to the navigation area as shown at 420. Having determined a destination and starting location, the visualization application 122 may access map data for the area of the starting and destination locations. The map data may include elevation data, terrain information, and notable locations and objects, such as water crossings, bridges, roads, ranger stations, campsites, and water sources, for example. The map data may also include indicators of difficult paths, areas of known danger, and other indicators of warning or avoidance. The visualization application 122 may orient the current location, the corresponding location of the map data, and the location of the destination.

The visualization application 122 may access the 3-dimensional map data associated with the navigation area. Having data associated with the navigation area, the visualization application 122 may update the current location and perform analysis of the data as shown at 440. The visualization application 122 may convert the 3-dimensional map data into a cartesian x/y/z position relative to the user with respect to the camera 124. Utilizing location nodes in augmented reality, a location node may be added at each cartesian x/y/z position for each corresponding GPS coordinate containing latitude and longitude and altitude data from the map elevation API or the elevation database (generically referred to as elevation data). The system combines what is known about movement through the augmented reality world with the most relevant core location estimate based on accuracy and time. These x/y/z coordinates are placed in a scene on the mobile device's camera output (display), which may be limited to a reasonable distance from where the user is standing and may be calculated in meters. An approximation may be used that gives reasonable accuracy out to a radius of 50 km, except at locations in high latitudes (greater than 60. After each point is added to the camera scene, they are compared to a given position of the next location node to determine the translation angle. The system using the mobile device's sensors (gyroscopes, accelerometers, GPS, and the like) senses for physical movement by the user in the real world. If movement is detected, the scene is recalculated and redrawn (virtually) in real-time after removing the previous location nodes and adding new ones at their new location relative to the user's new location. The system's constant checking of the sensors for changes in position and orientation, may allow the system to recalculate directional changes as well. When bearing from "self" to another point may return a bearing in +/– degrees from north. This function uses the haversine formula to compute a geodesic (great circle), assuming a spherical earth.

The haversine formula determines the great-circle distance between two points on a sphere given their longitudes and latitudes. Important in navigation, it is a special case of a more general formula in spherical trigonometry, the law of haversines, which relates the sides and angles of spherical triangles.

Note that, especially at high latitudes (greater than 60) and with relatively distant points, "a.bearing (between: b)" is not necessarily 180 degrees opposite to "b.bearing(between: a)". After each location node is added, a cylinder is drawn from point to point to create the trail path. The trail path scales based on distance from the path and the system adds a material and chamfer radius to the cylinder to make it look more like a trail when displayed on the camera view. The formulas used for calculations are on the basis of a spherical earth (ignoring ellipsoidal effects), which is accurate enough for most purposes. In fact, the earth is very slightly ellipsoidal so using a spherical model gives errors typically up to 0.3%.

The visualization application 122 may obtain continual location data from location module 118 and uses the location data in conjunction with available map data of the particular route areas and provides data relevant to the particular route area. The visualization application 122 formats and displays the information on the display 109 of the mobile device 108.

Having determined and analyzed data associated with the navigation route, the visualization application 122 may determine the path(s) based on the received data of current location, destination, 3-dimensional map data, direction of view, and the view angle as shown at 450. The visualization application 122 generates path and route data based on receiving the current location, using the 3-dimensional map data to position the user to the corresponding point on the map, determining the destination point relative to the map data, and orienting the map and position data based on the direction and incline of the view of camera 124. In some embodiments, the visualization application 122 may alter the display of a path or route to indicate attributes determined from data analysis.

In response to determining the path images from the input of data, visualization application 122 may send path overlay images to be displayed on display 109 of the mobile device 108 as shown at 440-460. The visualization application 122, in conjunction with the server 102 and trail database 104, may plot all of the coordinates along the path, and draw a cylinder between each point to create the virtual overlay of the trail route, as discussed above. The virtual images of the determined path(s) are sent to the mobile device 108 and are displayed as an overlay of the real-world view of the user (and where the user point's the camera of the mobile device). The path overlay images align with the view of the user and the display of the path adjusts to the direction and incline of view of camera 124. Having displayed the virtual path(s) or route images, which facilitate the user traversing them, the overlay images displayed on the display 109 may be refreshed and reloaded based on movement of the user from information retrieved from the trail database 104 or from at least one of the third-party providers 106*a-d*, as described above. Path images continue to update based on detected location as shown at 440 and the updated images are displayed on display 109.

Figure 5:
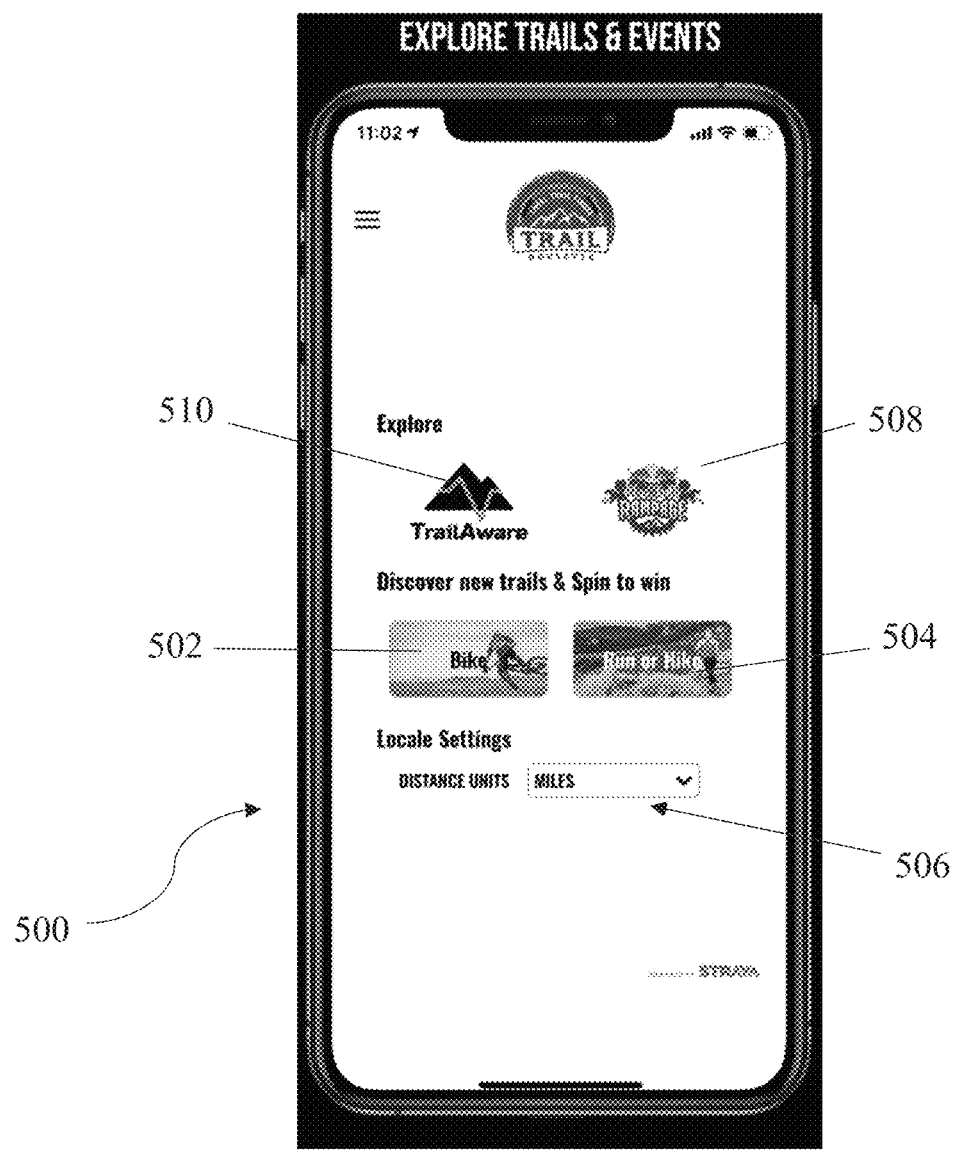
FIG. 5 illustrates an example of a user interface for accessing and using trail data by a user of the interactive systems and methods of the present disclosure showing the home screen.

FIG. 5 illustrates an example of a user interface for accessing and using trail data by a user of the interactive systems and methods of the present disclosure showing the home screen. As shown in FIG. 5, as soon as the user opens the App, they are presented with the screen shown. The user selects whether the user wants trail data for a biking trail 502 or a running/hiking trail 504. The user may also select to alter the distance units (miles, kilometers, meters, feet, etc.). Rather than selecting a trail based on spinning the user can also select explore (TrailAware™) 510 and simply select from a list of nearby trails. The user may alter the list by expanding or contracting how close the trails need to be. The user may also be presented with contemporaneous challenges 508 in which to compete.

Figure 6A:
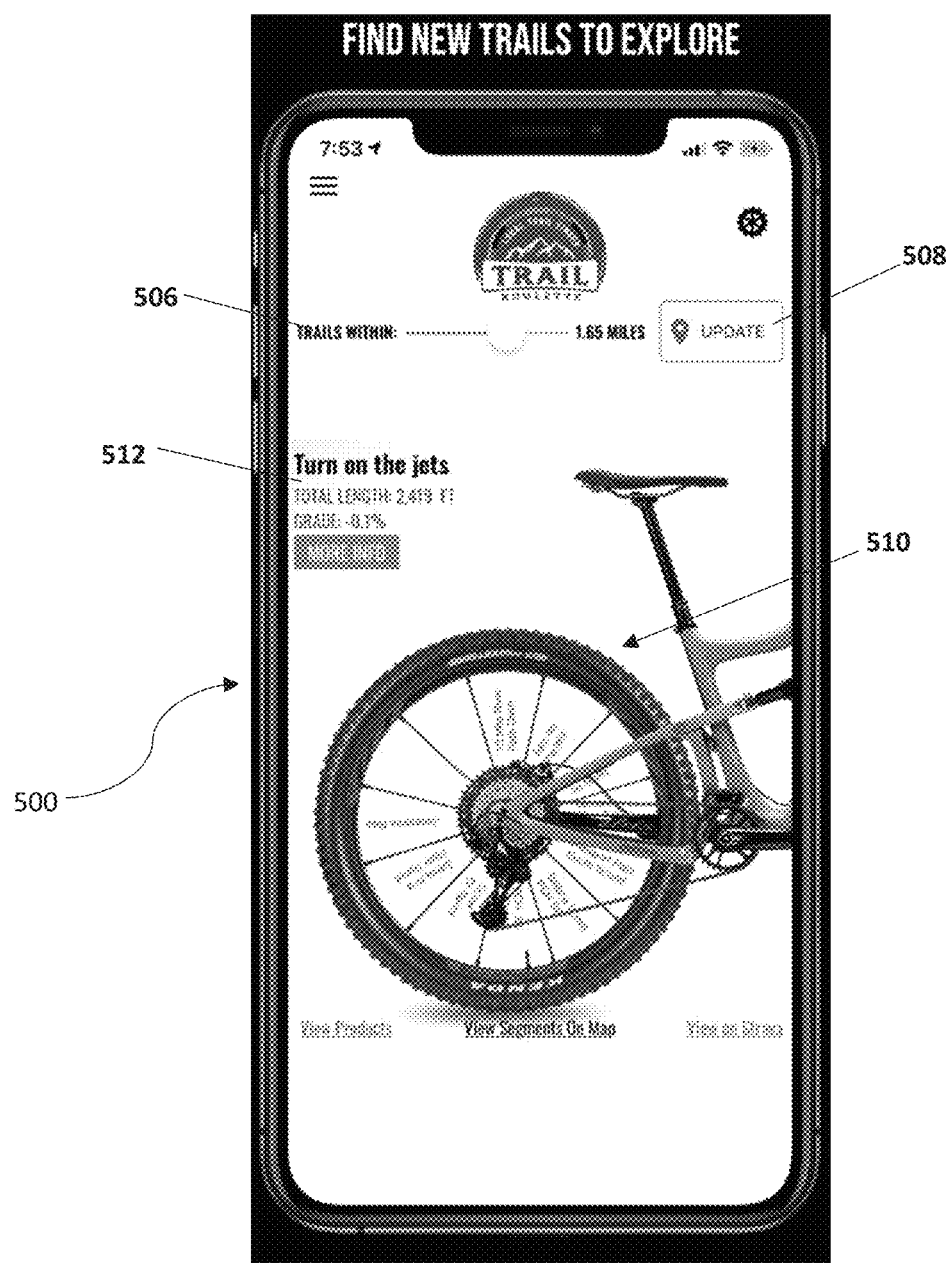
FIG. 6a illustrates an example of a bike trail selection wheel of one embodiment of the present disclosure.

FIG. 6*a* illustrates an example of a bike trail selection wheel of one embodiment of the present disclosure. As shown in FIG. 6*a* once the user has selected a bike trail 502, the user is presented with a variety of trails within a certain location from which to choose. As shown at 506, the user may select trails within 506 a certain location of the user's selected location. The user may update the selected location as shown at 508. Once the user has provided the location and distance, trails within that location are provided as shown at 510. The user may select one of trails, and then more information is shown about the trail, such as length, grade, etc. 512.

Figure 6B:
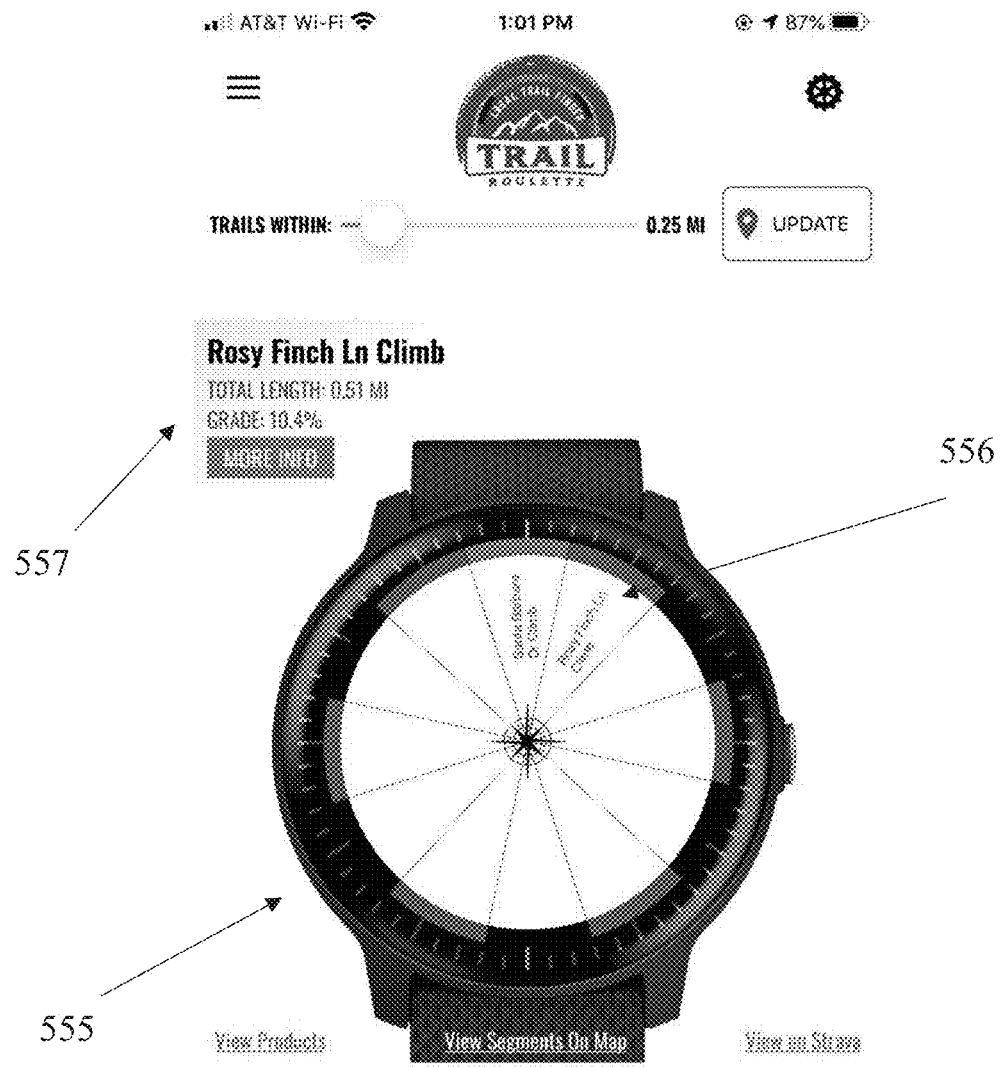
FIG. 6b illustrates an example of a hiking trail selection wheel of one embodiment of the present disclosure.

FIG. 6*b* illustrates an example of a hiking trail selection wheel of one embodiment of the present disclosure. FIG. 6*b* shows that the display 555 may be a compass or dial, which may display a list of trails 556. More information may be displayed 557 on the trails.

Figure 7:
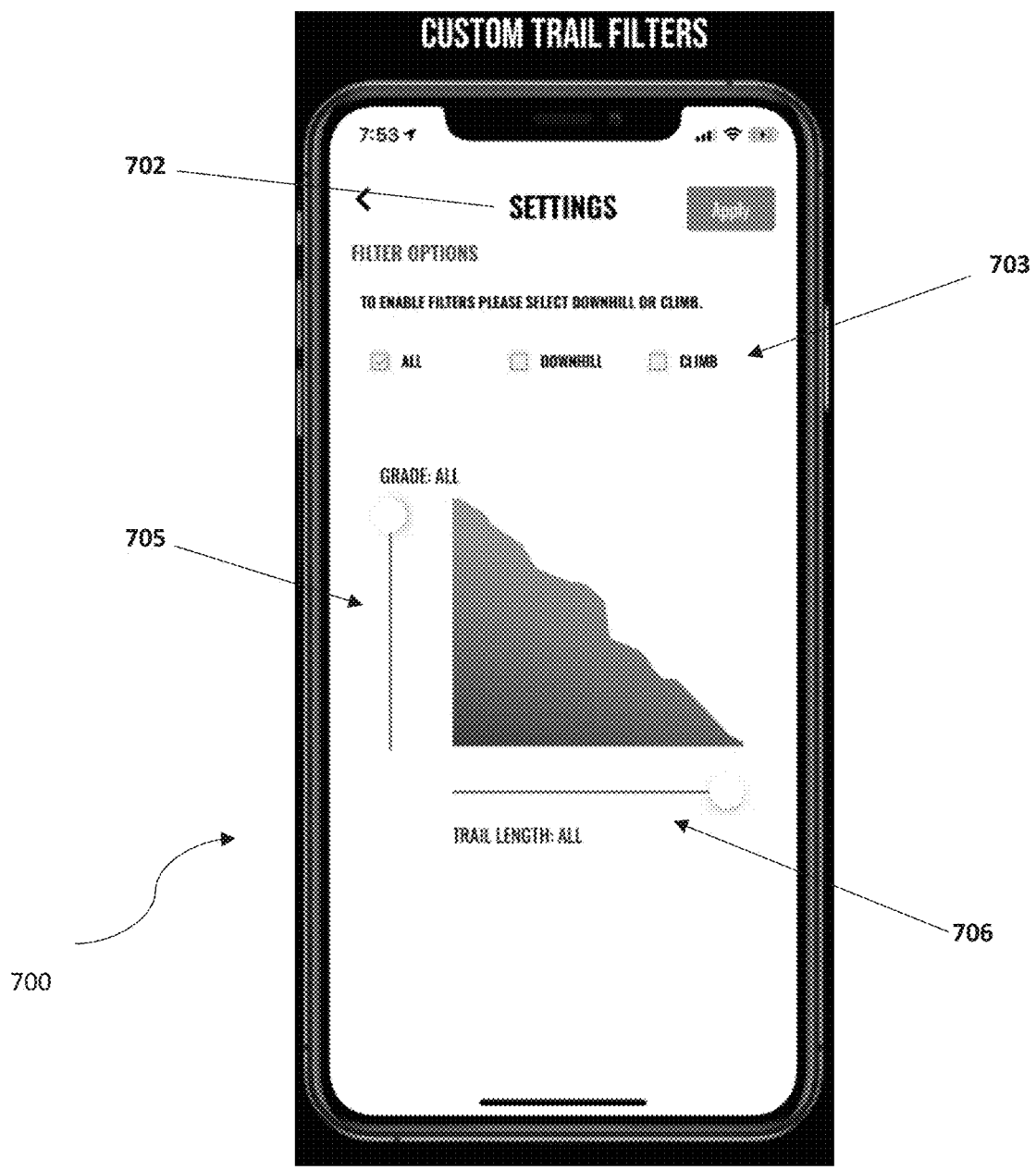
FIG. 7 illustrates an example of a setting screen of one embodiment of the present disclosure.

FIG. 7 illustrates an example of a setting screen of one embodiment of the present disclosure. As shown in FIG. 7, the settings 702 screen allows the user to filter 703 the trails that are suggested and/or displayed to the user based on certain criteria. In this instance, the user may filter based climb vs. downhill and trail distance. Further, the user may adjust the desired grade of a climb 705 and the length of the trail 706. The user may then apply these changes and go back to the trail selection or home screens.

Figure 8:
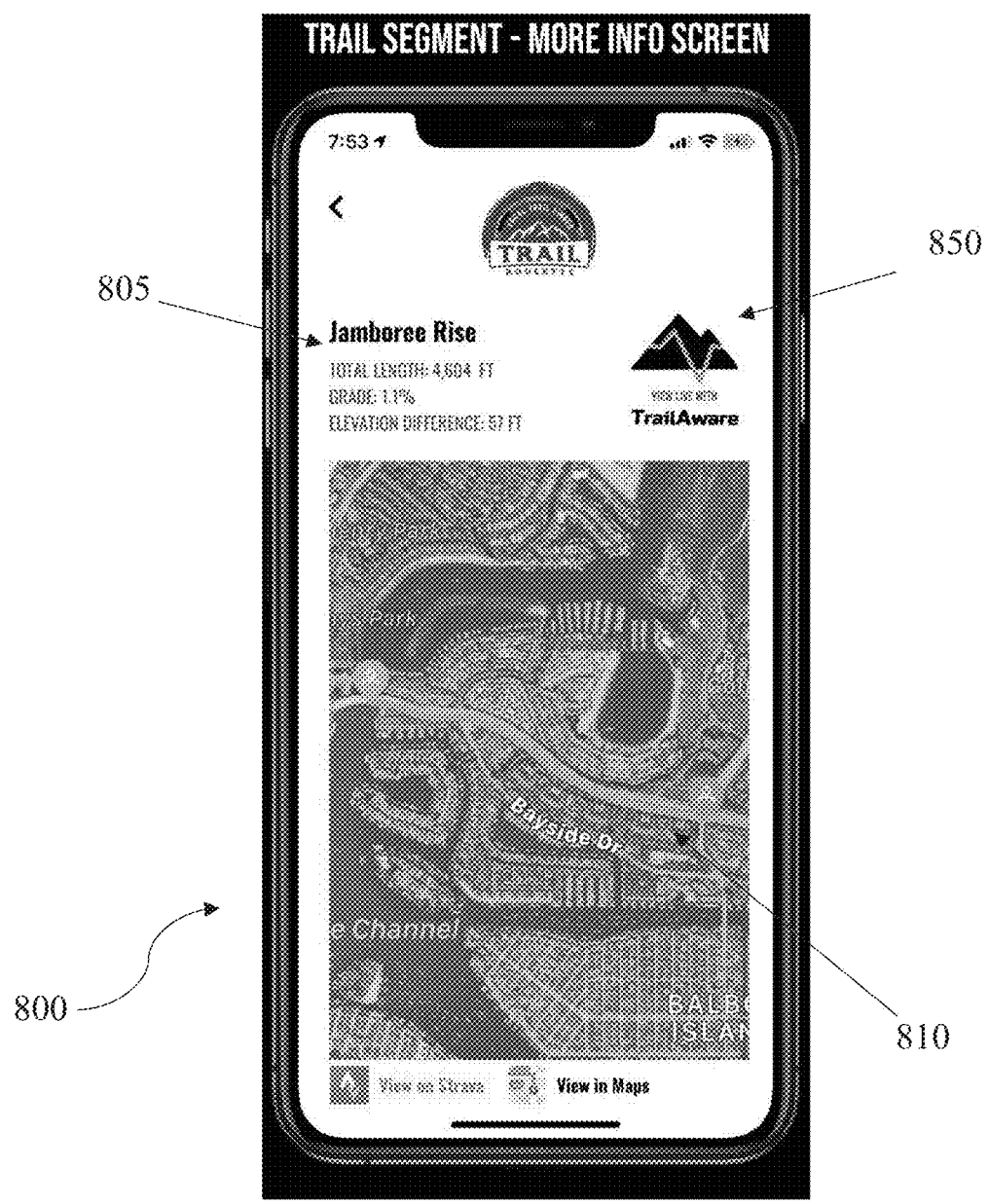
FIG. 8 illustrates one embodiment of a more information screen as viewed on a mobile device in accordance with an embodiment of the present disclosure and shows the trail overlaid on a satellite image map.

FIG. 8 illustrates one embodiment of a more information screen as viewed on a mobile device in accordance with an embodiment of the present disclosure and shows the trail overlaid on a satellite image map. When the more info button at 512 is selected, the user is provided with a satellite image map 800 with the trail overlaid on it 810. The screen also provides the basic information about the trail 805. The trail 810 may have a starting point and an ending point shown. If the user selects VIEW LIVE WITH TrailAware 850, the user is taken to the screen shown in FIG. 9.

Figure 9:
FIG. 9 illustrates one embodiment a virtual overlay image of trail data as viewed on a mobile device in accordance with an embodiment of the present disclosure.

FIG. 9 illustrates one embodiment a virtual overlay image of trail data as viewed on a mobile device in accordance with an embodiment of the present disclosure. FIG. 9 depicts an example of virtual overlay 900 of a travel route overview image as displayed on the camera view display 902 of the mobile device, in accordance with one embodiment. The virtual overlay 900 includes virtual path section 904, and destination 906. Virtual path section 904 may be displayed as a polyline overlaying a real-world view of the trail to traverse to destination 906. The line/virtual path section 904 may display a start of the path 905, which as shown through the camera view 902 is a trailhead several meters away from where the user is standing and facing. As the user moves, turns, and traverses the path, the virtual path section 904 resets and redisplays in real-time. This allows the user to accurately navigate the trail. Virtual path section may be displayed in a particular color, such as green as shown, indicating information associated with the portion of the route, such as "easy", "difficult", "dangerous", "rocky", "muddy", "water-crossing", or other informative designation. As an alternative to displaying virtual path section 620 in color, the path portion may be presented as a dashed or dotted display, with different dash and dot combinations corresponding to various path conditions and/or attributes. The examples illustrated in FIG. 9 herein are used only for the clarity of the description and are not limited to the illustrative embodiments. Additional data, operations, actions, tasks, activities, and manipulations will be conceivable from this disclosure and the same are contemplated within the scope of the illustrative embodiments.

Destination 906 marks the route destination. In some embodiments, the visualization application 122 may include route information corresponding to destination 906 (not shown) that may include distance from current location to destination, elevation difference between current location and destination, additional features found on the current route to destination, and a duration estimate to reach destination. The overlay 900 of the camera view 902 may further comprise a trademark 999, information about the trail 950, and the ability to take a photo 952.

The various embodiments and examples described herein are provided by way of illustration only and should not be construed to limit the scope of the various embodiments and examples. Those skilled in the art will readily recognize various modifications and changes that may be made to the present disclosure without following the example embodiments and applications illustrated and described herein, and without departing from the true spirit and scope of the present disclosure, which is set forth in the following claims. In addition, various embodiments may be combined. Therefore, reference to an embodiment, one embodiment, in some embodiments, in other embodiments, and the like does not preclude one or more methods, functions, steps, features, results, hardware implementations, or software implementations of different embodiments from being combined. Further, reference to an embodiment, one embodiment, in some embodiments, in other embodiments, examples, and the like provides various aspects that may or may not be combined with those of one or more different embodiments and/or examples.

What is claimed is:

1. A method of providing to a mobile device an augmented reality display of a virtual trail overlay that is aligned with a real world scene on a camera scene display, the mobile device comprising: a camera, a display, at least one processor, a visualization application, and one or more sensors, the mobile device being in networked communication via a network with a server and a trail database, the method comprising the steps of:
   generating a plurality of three-dimensional map data to be displayed as a virtual trail overlay for a plurality of trails, comprising the steps of:
   a. receiving by said server via said network a plurality of map data associated with one or more selected trails;
   b. analyzing by said server said received map data associated with said one or more selected trails to obtain a plurality of latitude and longitude coordinates for a plurality of reference points along each of said one or more selected trails;
   c. adding, for each of said one or more selected trails, each of said plurality of reference points to an object array;
   d. converting said object array to a compressed polyline;
   e. wherein said compressed polyline comprises a string of latitude and longitude coordinates;
   f. sending said string of latitude and longitude coordinates to a map elevation application program interface (API) service, which provides a plurality of altitude data;
   g. determining by said server an altitude for each of said plurality of reference points by using said string of latitude and longitude coordinates and said plurality of altitude data, such that a plurality of three-dimensional map data for each of said one or more selected trails is created for use in generating said virtual trail overlay;
   h. storing said plurality of three-dimensional map data in said trail database;
   i. receiving by said visualization application a trail navigation input, which comprises a destination location and at least a starting location for a selected trail to be traversed;
   j. accessing by said visualization application said plurality of three-dimensional map data associated with said trail navigation input of said selected trail to be traversed, such that said visualization application has a selected trail portion of said plurality of three-dimensional map data; and
   k. orienting and processing by said visualization application a current location of said mobile device with said selected trail portion in order to generate said virtual trail overlay on said camera scene display of said mobile device, comprising the steps:
      i. converting by said visualization application said selected trail portion of said plurality of three-dimensional map data into a plurality of cartesian x/y/z positions relative to said current location of said mobile device;
      ii. adding by said visualization application a location node at each of said plurality of cartesian x/y/z positions; and
      iii. placing each of said location nodes in said camera scene display and comparing a node position of each of said location nodes to a given location position of one or more surrounding location nodes in order to determine a translation angle, such that said virtual trail overlay is visible on said camera scene display of said mobile device;
   displaying said virtual trail overlay on said camera scene display of said mobile device, such that a user may follow an actual trail corresponding to said virtual trail overlay.

2. The method of claim 1, wherein said plurality of map data is provided by a third-party provider.

3. The method of claim 1, further comprising:
receiving by said server via said network one or more images associated with said one or more selected trails.

4. The method of claim 3, wherein said one or more images are provided by a third-party provider.

5. The method of claim 1, further comprising:
receiving by said server via said network a plurality of point of interest data associated with said one or more selected trails.

6. The method of claim 5, wherein said plurality of point of interest data is provided by a third-party provider.

7. The method of claim 1, further comprising:
generating by said server a plurality of elevation data for each of said one or more selected trails; and
displaying to said user a plurality of elevation changes along each of said one or more selected trails.

8. The method of claim 1, wherein if said map elevation API service does not have precise elevation data for each point in said plurality of elevation data, said elevation data is generated as interpolated data.

9. The method of claim 1, further comprising:
caching said plurality of three-dimensional map data for a selected trail to said mobile device.

10. The method of claim 1, further comprising:
recalculating and redrawing said virtual trail overlay on said camera scene display of said mobile device after movement is detected by said one or more sensors of said mobile device, such that said virtual trail overlay on said camera scene display of said mobile device is constantly being updated as said mobile device is moved, repositioned, or reoriented.

11. A method of providing an augmented reality display of a virtual trail overlay that is aligned with a real world scene on a camera scene display of a mobile device, the mobile device comprising a camera, a display, at least one processor, a visualization application, and one or more sensors, the mobile device being in networked communication via a network with a server and a trail database, the method comprising:
generating a plurality of three-dimensional map data to be displayed as a virtual trail overlay for a plurality of trails, comprising the steps of:
a. receiving by said server via said network a plurality of map data associated with one or more selected trails;
b. receiving by said server via said network a plurality of altitude data related to said plurality of map data associated with one or more selected trails;
c. combining by said server said plurality of map data associated with one or more selected trails and said plurality of altitude data, such that said plurality of three-dimensional map data for each of said one or more selected trails is created for use in generating said virtual trail overlay;
storing said plurality of three-dimensional map data in said trail database;
receiving by said visualization application a trail navigation input, which comprises a destination location and at least a starting location for a selected trail to be traversed;
accessing by said visualization application said plurality of three-dimensional map data associated with said trail navigation input of said selected trail to be traversed, such that said visualization application has a selected trail portion of said plurality of three-dimensional map data; and
orienting and processing by said visualization application a current location of said mobile device with said selected trail portion in order to generate said virtual trail overlay on said camera scene display of said mobile device, comprising the steps:
converting by said visualization application said selected trail portion of said plurality of three-dimensional map data into a plurality of cartesian x/y/z positions relative to said current location of said mobile device;
adding by said visualization application a location node at each of said plurality of cartesian x/y/z positions; and
placing each of said location nodes in said camera scene display and comparing a node position of each of said location nodes to a given location position of one or more surrounding location nodes in order to determine a translation angle, such that said virtual trail overlay is visible on said camera scene display of said mobile device.

12. The method of claim 11, further comprising:
recalculating and redrawing said virtual trail overlay on said camera scene display of said mobile device after movement is detected by said one or more sensors of said mobile device, such that said virtual trail overlay on said camera scene display of said mobile device is constantly being updated as said mobile device is moved, repositioned, or reoriented.

13. The method of claim 11, further comprising:
caching said plurality of three-dimensional map data for a selected trail to said mobile device.

14. The method of claim 11, wherein said plurality of altitude data is received from a map elevation application program interface (API) service.

15. The method of claim 14, wherein if said map elevation API service does not have precise elevation data for each point in said plurality of elevation data, said elevation data is generated as interpolated data.

16. The method of claim 11, further comprising:
generating by said server a plurality of elevation data for each of said one or more selected trails; and
displaying to said user a plurality of elevation changes along each of said one or more selected trails.

17. A method of providing to a mobile device an augmented reality display of a virtual trail overlay that is aligned with a real world scene on a camera scene display, the mobile device comprising a camera, a display, at least one processor, a visualization application, and one or more sensors, the mobile device being in networked communication via a network with a server and a trail database, the method comprising the steps of:
generating a plurality of three-dimensional map data to be displayed as a virtual trail overlay for a plurality of trails, comprising the steps of:
a. receiving by said server via said network a plurality of map data associated with one or more selected trails;
b. analyzing by said server said received map data associated with said one or more selected trails to obtain a plurality of latitude and longitude coordinates for a plurality of reference points along each of said one or more selected trails;
c. adding, for each of said one or more selected trails, each of said plurality of reference points to an object array;
d. converting said object array to a compressed polyline; wherein said compressed polyline comprises a string of latitude and longitude coordinates;

e. sending said string of latitude and longitude coordinates to a map elevation application program interface (API) service, which provides a plurality of altitude data;
f. determining by said server an altitude for each of said plurality of reference points by using said string of latitude and longitude coordinates and said plurality of altitude data, such that a plurality of three-dimensional map data for each of said one or more selected trails is created for use in generating said virtual trail overlay;
g. storing said plurality of three-dimensional map data in said trail database;
h. caching said plurality of three-dimensional map data for a selected trail to said mobile device;
i. receiving by said visualization application a trail navigation input, which comprises a destination location and at least a starting location for a selected trail to be traversed;
j. accessing by said visualization application said plurality of three-dimensional map data associated with said trail navigation input of said selected trail to be traversed, such that said visualization application has a selected trail portion of said plurality of three-dimensional map data; and
k. orienting and processing by said visualization application a current location of said mobile device with said selected trail portion in order to generate said virtual trail overlay on said camera scene display of said mobile device, comprising the steps:
   i. converting by said visualization application said selected trail portion of said plurality of three-dimensional map data into a plurality of cartesian x/y/z positions relative to said current location of said mobile device;
   ii. adding by said visualization application a location node at each of said plurality of cartesian x/y/z positions; and
   iii. placing each of said location nodes in said camera scene display and comparing a node position of each of said location nodes to a given location position of one or more surrounding location nodes in order to determine a translation angle, such that said virtual trail overlay is visible on said camera scene display of said mobile device;

recalculating and redrawing said virtual trail overlay on said camera scene display of said mobile device after movement is detected by said one or more sensors of said mobile device, such that said virtual trail overlay on said camera scene display of said mobile device is constantly being updated as said mobile device is moved, repositioned, or reoriented.

18. The method of claim 17, further comprising:

generating by said server a plurality of elevation data for each of said one or more selected trails; and displaying to said user a plurality of elevation changes along each of said one or more selected trails.

19. The method of claim 18, wherein if said map elevation API service does not have precise elevation data for each point in said plurality of elevation data, said elevation data is generated as interpolated data.

* * * * *